Figure 1:
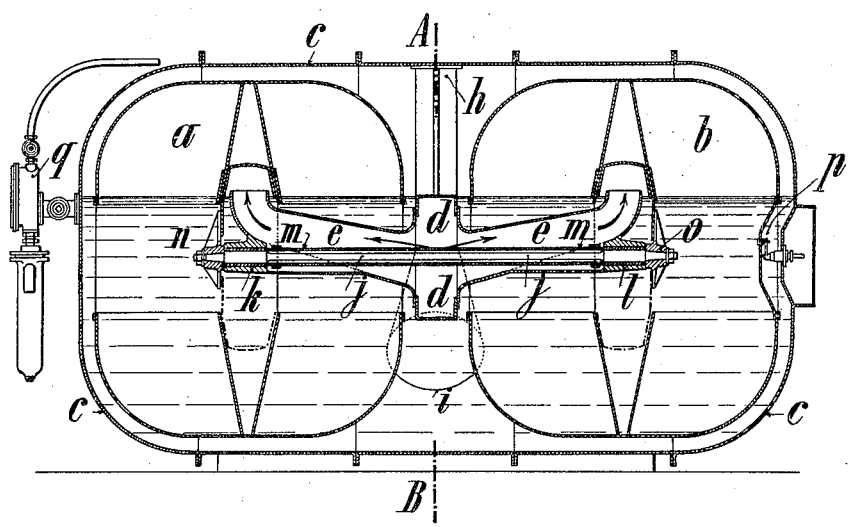

No. 770,302. PATENTED SEPT. 20, 1904.
L. MILLET.
GAS METER.
APPLICATION FILED JULY 3, 1903.
NO MODEL.

Witnesses
Inventor
Laurent Millet,
By his Attorney

No. 770,302. Patented September 20, 1904.

UNITED STATES PATENT OFFICE.

LAURENT MILLET, OF PARIS, FRANCE, ASSIGNOR TO LA COMPAGNIE POUR LA FABRICATION DES COMPTEURS ET MATERIÉL D'USINES À GAZ, OF PARIS, FRANCE.

GAS-METER.

SPECIFICATION forming part of Letters Patent No. 770,302, dated September 20, 1904.

Application filed July 3, 1903. Serial No. 164,237. (No model.)

*To all whom it may concern:*

Be it known that I, LAURENT MILLET, a citizen of the French Republic, residing at Paris, France, have invented certain new and useful Improvements in or Relating to Gas-Meters, of which the following is a specification.

In ordinary gas-meters intended to register large volumes of gas—for instance, the output of a gas-generator of large capacity or that of gas-works of a town of considerable size—the speed of the registering-drum must not exceed a certain limit beyond which the resistance of water to the movement of the blades would produce a loss of charge, which would render the registering inaccurate and would interfere with the good working of all the apparatus used for the manufacture and for mechanical and chemical purifying of the gas passing into the meter. As this resistance increases in much greater proportion than the speed of the wheel itself, it is obvious that the maximum number of revolutions of a wheel is the smaller the larger its size. This results in the necessity of making use in meters of large capacity only of an exceedingly small speed, which for ordinary meters of one hundred thousand cubic meters per twenty-four hours' capacity is sixty revolutions per hour, while a meter of half the capacity may revolve without any inconvenience at a speed of eighty to eighty-five revolutions. Consequently a meter of one hundred thousand cubic meters, although its capacity is only double that of a meter of fifty thousand cubic meters, must have a measuring-wheel three times as large as that of the latter. Meters of large capacity have therefore a much larger volume in comparison with meters of smaller capacity than would be necessitated simply by the quantity of gas passing through them. This inefficient utilization of their volume is not the only defect of meters of large capacity, which have besides the drawback of being more difficult to erect and of working in a less uniform manner than meters of smaller capacities, owing to the measuring-drums of large meters always greatly agitating the water and producing fluctuations of pressure, which, however, also take place, although to a much smaller extent, in small and medium-sized meters. Moreover, the construction of the large meters used hitherto necessitates the casing being made exceedingly rigid, as it had to support the whole weight of the measuring-drums and inlet and outlet pipes and resist the reaction corresponding to the effort made in order to produce rotary movement, and in consequence this casing is always made in the form of a cast-iron cylinder and two disks, which are the most important and the most expensive part of the apparatus. It must be also pointed out that in order to avoid deformation of the rotatory wheels of large size it is necessary to strengthen them well by means of angle-irons or other braces, which owing to their projecting from the surface of the blades increase the resistance of the water to the movement.

The above description of the drawbacks of old constructions is necessary to enable the advantages of the meter for large volumes according to this invention to be better understood. This matter is entirely different from those used hitherto as regards the utilization of the material used, uniformity of working, and design.

A meter according to this invention is shown, by way of example, in the accompanying drawings, in which—

Figure 2:
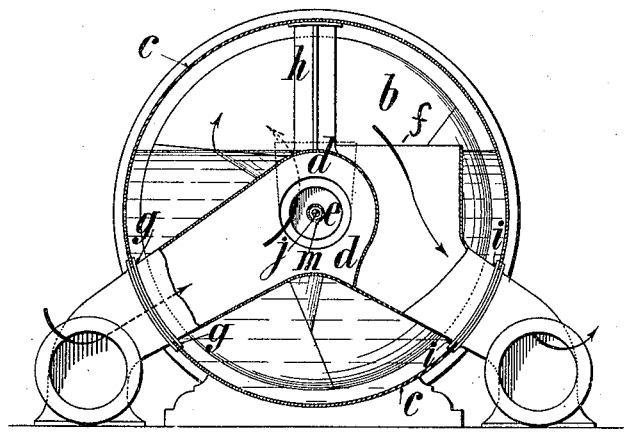

Figure 1 is an elevation in longitudinal section of the whole apparatus. Fig. 2 is a side elevation in vertical cross-section on the line A B of Fig. 1.

The apparatus shown is mainly constituted by two measuring-drums $a$ $b$, which may be either of the duplex type with central distributing-chamber, as shown in the drawings, or of any other suitable type. The two drums $a$ $b$ are inclosed in a cast-iron or sheet-metal casing $c$, filled with water to a given level. Gas is admitted into the drums through a central hollow part $d$, which is simultaneously used as an inlet-pipe into the measuring-drums by its branches $e$ and as an outlet-pipe by its other branches, $f$, through which the gas escapes after having passed through the drums, and also as a bearing for the drum-spindle and as a strengthening device, preventing the casing, to which the radiating parts $g$ $h$ $i$ of the said central part $d$ are secured, from collapsing.

The spindle $j$ of the two drums $a$ $b$ passes through the length of the central gas-inlet pipe $e$ and rotates in two bearings $k$ $l$ within the drums, connected by a tube $m$ to prevent water, which might get between the bearing and the journals owing to the existing clearance, from flowing to the central hollow part $d$.

The two drums or wheels $a$ $b$ are mounted on the ends of the spindle $j$ by means of two hubs or sleeves with cross-bars $n$ $o$, and one of them operates, by means of a pin $p$, the registering mechanism.

$q$ is a water-gage with an overflow-siphon identical with those generally used on ordinary meters.

The advantages of the construction described are as follows:

First. The axial strains produced under the action of the pressure of the gas and the resistance offered by the water to the movement of the blades acting in opposite directions counteract each other. The wheels rotate, therefore, under very favorable conditions of equilibrium, and the working is therefore much more uniform than that of ordinary meters.

Second. The inlet and outlet pipes and valves, as well as the bearings of the drum-spindle, instead of being mounted on the bottom and on the cylindrical casing, as in ordinary meters, are carried by the hollow central part, so that both the front and the back of the casing can be easily removed when it is necessary to examine the interior of the apparatus.

Third. In order to insure perfect stability of the apparatus, it is sufficient to make the central part $d$ perfectly rigid. This part has besides to resist only a bending strain due to the weight of the two drums or wheels; but as the latter are balanced as regards their weight and strains they do not produce any torsion or vibration in the central part $d$. The outer cylinder and the two covers, having no heavy parts to carry and being entirely independent of the drums or wheels, constitute merely a simple casing, which, unlike that of ordinary meters, may be made of quite light material—for instance, of thin sheet metal.

Fourth. As regards rigidity the two connected wheels work under much better conditions than a single wheel of the same capacity, so that at least for ordinary capacities it is not necessary to stiffen them with angle-irons or the like, this resulting in a saving of labor and expense. Moreover, the blades of the combined wheels have no projections, and therefore move easily through the water without agitating it, as in meters with a single wheel of large capacity, this agitation being due both to their great circumferential speed and to the resistance of their strengthening-pieces, which are necessary in order to avoid deformation of the blades.

Fifth. Finally, and it is the chief advantage and the main characteristic feature of the gas-meter according to this invention, the meter is greatly superior to other meters with a single drum as regards efficiency. In fact, it is obvious that the two measuring-drums can revolve at a normal speed corresponding to the capacity of each of them, which is half the total capacity of the meter, whereas a meter with a single drum of the same total capacity would not revolve at the same speed, but could have to rotate at a much smaller speed, owing to its large dimensions and for reasons above stated. Consequently for the same output and for the same absorption of pressure a single-drum meter would necessarily have to be of a much greater volume and weight than one with two connected drums.

What I claim as my invention, and desire to secure by Letters Patent, is—

1. A wet gas-meter comprising a casing, two similar measuring-drums horizontally and rotatably mounted therein and a common gas-inlet and a common gas-outlet communicating therewith in the manner substantially as set forth.

2. A wet gas-meter comprising two measuring-drums mounted to revolve in unison about a common horizontal axis within a casing common to both, a common gas-inlet and a common gas-outlet communicating with said drums in the manner described and a spindle supporting said drums journaled within the gas-outlet.

3. In a wet gas-meter the combination with two measuring-drums revolving in unison about a common axis in a casing common to both, a common gas-inlet and a common gas-outlet communicating therewith in the manner described, of a chamber situated between said drums and divided into two compartments communicating respectively with the gas inlet and outlet and with said drums.

4. In a wet gas-meter the combination with two measuring-drums revolving in unison about a common axis in a casing common to both and a common gas-inlet and a common gas-outlet communicating therewith in the manner described, of a chamber between said drums and divided into two compartments communicating with a gas inlet and outlet and the drums and containing the spindle supporting said drums.

In testimony whereof I have signed my name to this specification in the presence of two subscribing witnesses.

LAURENT MILLET. [L. S.]

Witnesses:
 LOUIS SULLIGER,
 J. ALLISON BOWEN.